United States Patent [19]

Ferris

[11] 4,087,203
[45] May 2, 1978

[54] CROSS BEAM ROTOR

[75] Inventor: Donald Leroy Ferris, Newtown, Conn.

[73] Assignee: United Technologies Corporation, Hartford, Conn.

[21] Appl. No.: 757,168

[22] Filed: Jan. 7, 1977

[51] Int. Cl.² ............................................. B64C 27/38
[52] U.S. Cl. ............................ 416/141; 416/134 A; 416/138
[58] Field of Search ............... 416/134 A, 138 A, 141, 416/140

[56] References Cited

U.S. PATENT DOCUMENTS

| | | | |
|---|---|---|---|
| 2,949,967 | 8/1960 | Jovanovich | 416/134 A |
| 3,470,962 | 10/1969 | Cure | 416/141 X |
| 3,484,174 | 12/1969 | McCoubry | 416/134 A X |
| 3,501,250 | 3/1970 | Mosinskis | 416/140 A |
| 3,669,566 | 6/1972 | Bourquardez et al. | 416/140 A |
| 3,874,815 | 4/1975 | Baskin | 416/141 X |
| 3,880,551 | 4/1975 | Kisovec | 416/141 X |
| 3,926,536 | 12/1975 | Ciastula et al. | 416/141 X |
| 3,999,886 | 12/1976 | Ormiston et al. | 416/141 X |
| 4,008,980 | 2/1977 | Noehren et al. | 416/134 A |

*Primary Examiner*—Everette A. Powell, Jr.
*Attorney, Agent, or Firm*—Vernon F. Hauschild

[57] ABSTRACT

A helicopter rotor having opposed blades interconnected by a common flexible spar which passes across the rotor axis is connected to the drive shaft by clamped hub plates. A spanwise extending torque tube having a pitch horn at its inner end forms a rigid connection with the spar and blade at its outboard end. A centering bearing assembly is positioned at the inner end of the torque tube and spar to react control loads, centralize the torque tube about the spar, and provide pitch, flap, and lead-lag decoupling.

5 Claims, 9 Drawing Figures

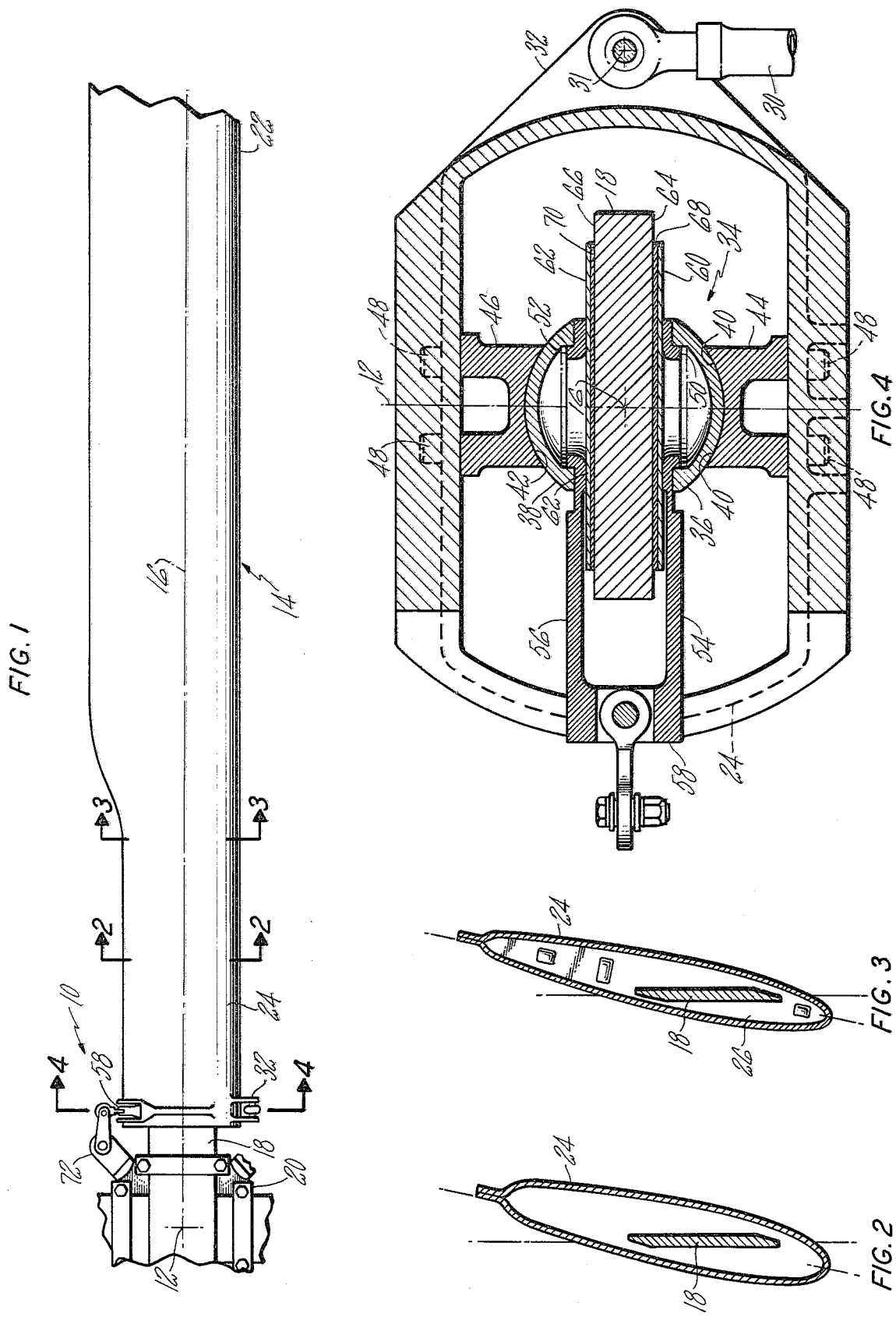

CROSS BEAM ROTOR

BACKGROUND OF THE INVENTION

1. Field of the Invention

This invention relates to a helicopter rotor having an even number of blades wherein the opposed blades have a common rotor hub attachment member in the form of a flexible spar, or flexbeam. Generally rectangular in cross-section, the spar reacts the centrifugal load between opposite blades and may extend the full rotor diameter from blade tip to tip or may terminate at a convenient radial station. The spar is designed for extreme flexibility in torsion and flapwise bending to accommodate pitch change and blade flapping excursions respectively, while exhibiting a lesser degree of flexibility in the in-plane direction where lead-lag motions are encountered. This invention is adaptable to rotor configurations wherein the blade to hub attachment means consists of upper and lower plate members which rigidly clamp together around the blade spar. Pitch change is introduced to the blade through conventional control rods to a horn on the inner end of a torque tube which connects to the blade and spar at a radial distance sufficient for the spar to tolerate twisting between its inboard clamped station and its outboard blade connection station. The torsional stress reacted by the spar produced by pitch change twisting is a function of this length, and is proportional to the slope of the curve resulting from a plot of spar angle of attack to radial length. The particular area in which this invention is most concerned is the possible adverse coupling effect produced when one deliberately introduced motion imposed on a blade tends to introduce a motion of another type; in some cases an adverse or unstabilizing motion. This tendency to produce adverse coupling effects is most frequently exhibited when the three degrees of rotor blade freedom (pitch, flap, and hunting, i.e., lead-lag) are reacted by a single joint or flexure member rather than by individual articulated joints or hinges. This invention is directed to isolate lead-lag motions of the spar member from pitching motions. Heretofore, a lead-lag (in-plane) motion tended to increase or decrease the pitch horn radius, and thus provide a lesser or greater degree of pitch change than desired.

2. Description of the Prior Art

The most significant phase of development of the cross beam rotor has occurred in the last 10 years, and the efforts of the assignee of this invention is revealed in the paper entitled, "Composite Bearingless Tail Rotor for UTTAS", dated May 1976 by R. Fenaughty and W. Noehren presented at the 32nd Annual National V/STOL Forum of the American Helicopter Society, the contents of which are incorporated herein by reference. The basic concept of the common spar for opposed blades is depicted therein and also in the Arcidiacono Canadian Pat. No. 951,301 wherein a rigid torque tube having a pitch horn at its inboard end is utilized to introduce pitch changes to the airfoil shaped blade connected to the flexible spar and outboard end of the torque tube. With no centering member between the spar and torque tube at the inner end, an adverse pitch-flapwise bending coupling was introduced. This led to the use of a snubber in the form of an elastomeric bearing, centering the spar within the torque tube at the pitch horn station. This development is depicted in the paper and was incorporated in the YUH-60A prototype helicopters produced by Sikorsky Aircraft, commonly identified at UTTAS.

An early known invention is the U.S. Pat. No. 3,484,174 to McCoubrey which allows for blade flapping excursions by a gimbaled hinge. None of these references address the specific problem of pitch/lead-lag coupling nor depict structure which will prevent or reduce it. One reason for this omission is thought to be the general heretofore limitation of the usage of the cross-beam rotor to helicopter tail rotor or windmill applications. In these applications rotor diameters are relatively short and blade masses smaller than the full 40 to 100 feet diameter helicopter main rotors. Lead-lag blade excursions are of less magnitude and pitch coupling efforts are less severe in tail rotors and can be tolerated. As the state of the art advances toward introduction of the cross beam type rotor as a main rotor, it becomes desirable to address the pitch coupling situation, and such is the objective of this invention.

A further reference depicting the prior art rotor is the U.S. Pat. No. 3,874,820 to R. Fenaughty. This patent addresses the angular relationship between the spar and airfoil members and is an embodiment to which the invention presented here is specifically adaptable. Further, this same embodiment is also depicted in currently pending U.S. application Ser. No. 590,773 of E. Hibyan and W. Noehren filed June 26, 1975. Torque tube structure and hub plate attachment members similar to the structure of this invention are shown in detail therein.

Other art in the field of cross beam rotors that is known but not specifically pertinent due to the absence of torque tube attachment members is the U.S. Pat. No. 3,874,815 to Baskin issued April 1, 1975 and the currently pending U.S. patent application Ser. No. 751,006 of R. Rybicki filed Dec. 15, 1976.

SUMMARY OF THE INVENTION

This invention addresses the problem of pitch coupling as a function of a lead or lag blade spar motion wherein such coupling can introduce more or less pitch angle change into the blade than is desired. This pitch coupling can lead to rotor instability and control problems and require pilot monitoring so as to introduce corrective inputs. The teaching of this invention is to isolate the lead-lag motions of the spar from its pitch motions, and this is accomplished by utilizing dual bearing means at the inboard attachment point of the torque tube to the blade spar; one of a linear and one of a spherical nature. It is an important feature that the linear sliding take place between the spar and the spherical bearing means, rather than between the spherical bearing and the torque tube.

BRIEF DESCRIPTION OF THE DRAWINGS

FIG. 1 is a plan view of a four-bladed helicopter rotor of the cross beam configuration, with one blade illustrated.

FIG. 2 is a cross sectional view taken along the lines 2—2 of FIG. 1 which illustrates the spar and torque tube clearance relationship.

FIG. 3 is a cross sectional view taken along the lines 3—3 of FIG. 1 to illustrate the connection between the torque tube and spar.

FIG. 4 is a cross sectional view taken along the lines 4—4 of FIG. 1 to illustrate the inboard connection between the torque tube and blade spar and to more particularly depict the preferred embodiment of this invention.

FIG. 6b differs from FIG. 6a in that it depicts a blade lagged condition.

FIG. 7b differs from FIG. 7a in that it depicts a blade lagged condition.

DESCRIPTION OF THE PREFERRED EMBODIMENT

Figure 5:
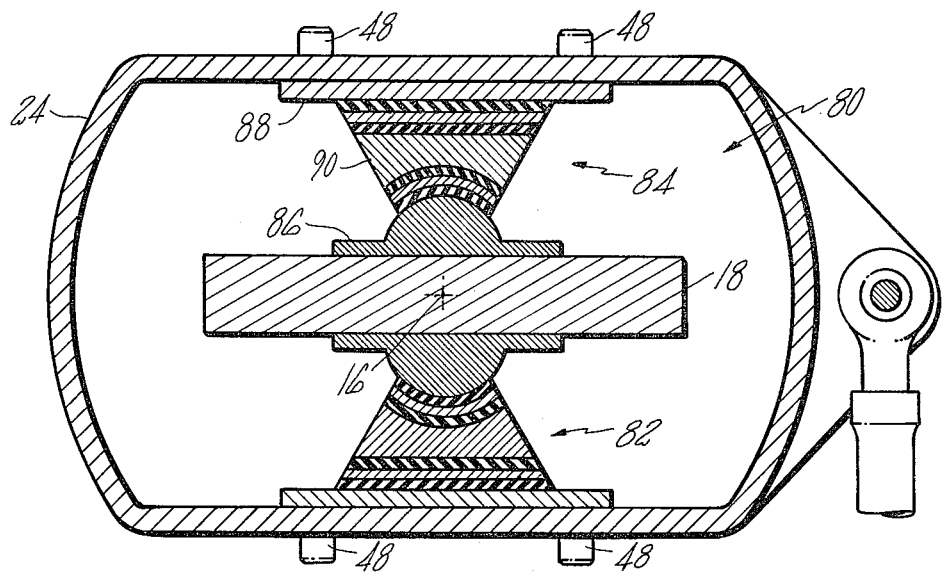
FIG. 5 is a cross sectional showing of a prior art rotor taken at a radial station similar to that of the FIG. 4 view.

The basic environment of the invention is shown in FIG. 1 as a helicopter main or tail rotor 10 depicted to rotate in a clockwise direction about vertical axis 12. An even number of blade assemblies 14 (one shown only) extend in opposite directions from the rotor axis 12 and are supported and balanced for pitch change motion about feathering axis 16. Opposed blade pairs have a common supporting flexible spar 18 to react the centrifugal load between blades, the torsional load of pitch changing, and both flapwise and edgewise (lead-lag) bending. The degree of spar flexibility and stiffness is a function of its length, cross-sectional area, shape, material, and allowable stresses. Generally a rectangular shaped spar as depicted in the drawings is preferred, having greatest flexibility in the flapwise direction. Rotational motion is imparted to the rotor 10 by a drive shaft (not shown) which is attached to mating hub plates 20 positioned to engage the spar 18 and impart such rotational motion by means of rigid attachment thereto. Such hub attachment means is more fully illustrated in U.S. patent application Ser. No. 590,773 to Hibyan and Noehren. The blade assembly 14 is formed of one or more sections to provide an airfoil contoured portion 22 for the greater length of its outer span, and an elliptical shaped torque tube portion 24 at its root section. The portion of the spar 18 that must twist to accommodate pitch change is allowed clearance freedom under the torque tube, as shown in FIG. 2. FIG. 3 illustrates the rigid connection between the blade 14 and spar 18 by means of closure rib 26. Just outboard of this attachment point, the blade contour transitions to form the true airfoil contour. The torque tube 24 is of rigid construction compared to the flexible blade spar 18, and is designed to transmit the torque of pitch change inputs to the outer blade portion 22 at the spanwise station where the spar 18 attaches to the blade 14. As best shown in FIG. 4, pilot introduced pitch motion requirements are transmitted through pitch rods 30 at pivot point 31 to a pitch horn 32 on the leading edge side of the root end of the torque tube 24. For a tail rotor application it may be desirable to pass a single pitch shaft along the rotor axis, through the hub plates and crossing spars, to a spider member which attaches to the individual blade push rods 30, as illustrated in the above identified Hibyan et al application. For applications including main rotors, it may be preferable to utilize a conventional swashplate assembly, located externally to the drive shaft and transmission support.

With reference to FIG. 4, the torque tube 24 is shown in relationship to the spar 18, to which it is attached by means of bearing assembly 34. This assembly 34 includes spherical bearing halves 36 and 38, located on opposite sides of the spar 18, with their respective spherical surfaces in mating engagement with the concave spherical sockets 40 and 42 of centering posts 44 and 46. An anti-friction coating or liner may be used on one or both mating surfaces. These posts in turn are attached to torque tube 24 by bolts 48, and serve to retain the bearing assembly concentric with feathering axis 16. At this point it may be observed that a pitch change input through control rod 30 at pivot 31 of pitch horn 32 to torque tube 24 will introduce a twist to the spar 18 at the outboard radial blade station where the spar is attached rigidly to the torque tube (shown in FIG. 3). Due to the pitch freedom provided by the bearing assembly 34, rotation of the torque tube will take place relative to the restrained spar root portion. At the heart of this invention is the provision for a second sliding freedom for the spar 18, and it is important that this freedom be provided inside of, rather than outside of the first sliding freedom provided between ball halves 36 and 38 and sockets 40 and 42. Piloted to the bearing halves 36 and 38 are internal flanges 50 and 52, which are formed at the ends of arms 54 and 56. These arms 54 and 56 extend from linkage 58, utilized as illustrated in FIG. 4 to provide lead-lag damping to the root end of the torque tube 24. The surfaces of arms 54 and 56 which face the spar 18 are coated or lined with an anti-friction substance which contacts wear strips 60 and 62, which are bonded to the spar surfaces 64 and 66 by flexible pads 68 and 70. Flanges 50 and 52 provide a rigid engagement with ball halves 36 and 38 such that any lateral motion of the torque tube 24 and bearing assembly 34 will push or pull arms 54 and 56 in the same lateral direction. The linkage 58 conducts this lateral motion to conventional rotary damper 72. This damper 72 and associated linkage may be eliminated if torque tube damping is not required or desired.

As depicted in FIG. 5, prior art cross beam rotors have been produced wherein a "snubber" 80 has been utilized to react control loads and eliminate pitch-flap coupling. Combination spherical and flat disc elastomeric bearing halves 82 and 84 provide three degrees of freedom between the torque tube 24 and the root end of the spar 18. These freedoms are the relative motions caused by pitch changes, flapwise bending, and lead-lag. Each bearing half 82 and 84 is comprised of spherical race 86, flat race 88, and intermediate race 90 which is spherical and flat on its opposite surfaces. These races enclose alternating spherical and flat metal and rubber laminates respectively. Races 86 are bonded or otherwise fastened to opposite sides of the blade spar 18, while outer races 88 are attached, as by bolts 48, to the torque tube 24. The spherical bearing portions of the snubber 80 accommodate the pitch motions of the torque tube 24 and the flapwise bending of the spar 18, while the flat disc portions accommodate the relative linear motion caused by leading or lagging of the blade.

OPERATION

Figure 6A:
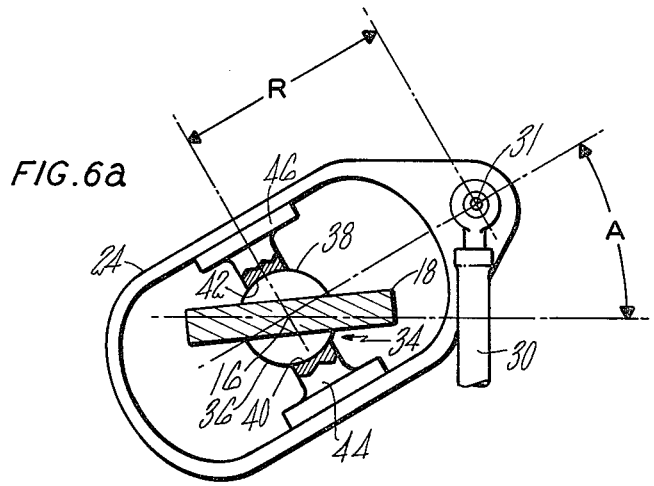
FIGS. 6a and 6b are schematic illustrations of the improvement of this invention similar to the FIG. 4 view, and shown with a pitch change input.

The advantages and operation of this invention are illustrated more specifically with reference to FIG. 6a. Pitch horn radius R is established as the arm length between pivot 31 and bearing assembly 34. Motion of rod 30 has rotated the torque tube 24 through angle A, and has twisted the outer end (not shown) of spar 18 through the same angle to introduce that pitch angle to the airfoil portion 22 of the blade 14. Due to the hub support clamping, the root end of spar 18 is only slightly twisted, as shown. (The background and outer portion of spar 18 are not depicted for clarity.) The capability of the torque tube 24 to rotate relative to the inner end of the spar 18 is achieved by the freedom allowed between the bearing sockets 40 and 42 of centering posts 44 and 46 and the spherical ball halves 36 and 38 of bearing assembly 34.

Figure 6B:
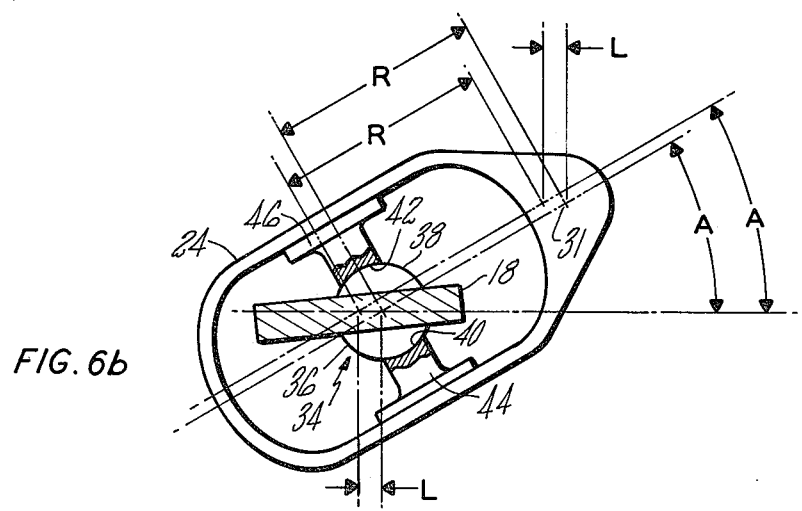

FIG. 6b depicts the imposition of an additional blade motion over the pitch change motion illustrated as FIG. 6a; namely that of a lag deflection imparted to the blade. Such lag may occur as a result of rotor starting, from a wind gust, or normal hunting of the blade, and it is desirable that such lag not effect the desired pitch change. In FIG. 6b the torque tube 24 is shown displaced to the right a distance "L" in the flatwise direction of spar 18 to represent the lag displacement. This displacement L is depicted at both the pivot location 31 and at the center of the bearing assembly 34. It should be noted that during a lag excursion of the blade 22 the torque tube outer portion will also be displaced in the lag direction with the blade portion 22, but due to its rigidity, the inboard portion of the torque tube 24 will be displaced in the opposite, or lead, direction. Distance "L" depicts this displacement of the torque tube 24, centering posts 44 and 46, sockets 40 and 42, and bearing halves 36 and 38 as they all slide together relative to spar 18. The bearing assembly 34 which defines the pitch horn radius R remains fixed to the torque tube 24, and there is no influence to change the pitch horn radius R nor to change the pitch angle input A. The effect of any vertical inclination of pitch rod 30 on the flatwise location of pivot 31 as it displaces the distance L is very small and is insignificant.

Figure 7A:
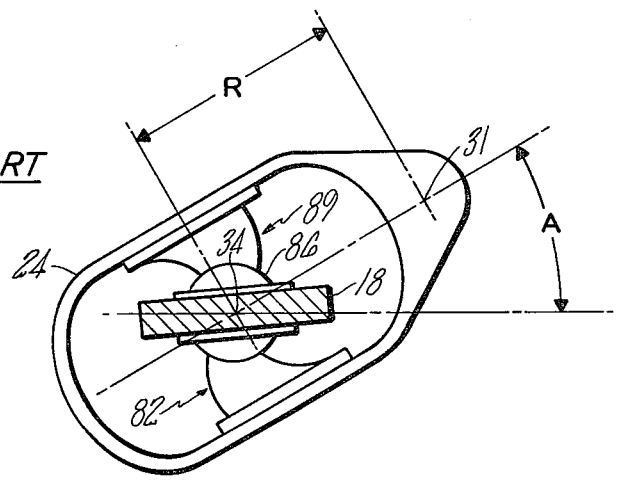
FIGS. 7a and 7b are schematic illustrations of the prior art spar/torque tube connections similar to the FIG. 5 view, and shown with a pitch change input.
Figure 7B:
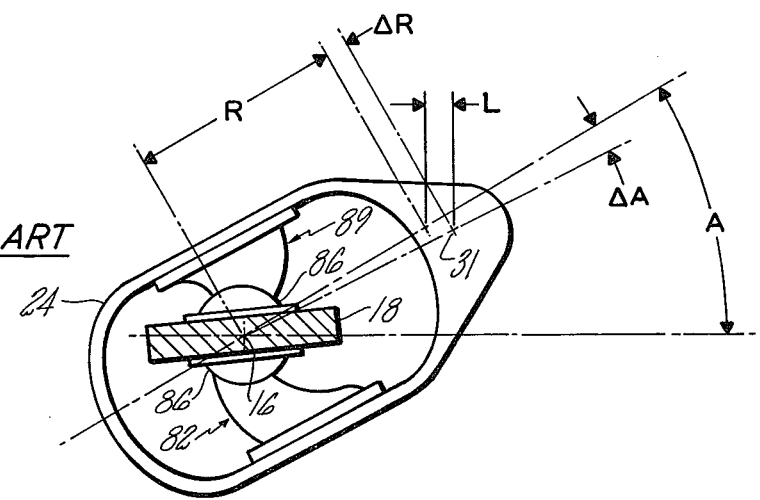

FIGS. 7a and 7b depict the prior art rotor under the same respective conditions as described for FIGS. 6a and 6b. The root end of the spar 18 is shown slightly twisted due to the input of pitch angle A on the torque tube 24 and outer blade portion 22. As described with regard to the embodiment of FIG. 5a, the pitch horn radius R is established between the center of the bearing assembly 34 and pivot 31. In FIG. 7a, pitch angle A has been introduced over radius R and has deflected the snubber 80, thus accommodating the twist imparted to the torque tube 24 and the blade outer portion 22. FIG. 7b depicts the imposition of the same additional lag motion imparted to the blade as presented in FIG. 6b. The torque tube 24 is shown displaced to the right the same distance "L", depicted at the pivot 31. Displacement of the pivot 31 is limited to the flatwise direction as in the FIG. 6b showing by control linkage fixation. Unlike the structure shown in FIG. 6b, it is only the torque tube 24 and a portion of snubber 80 that has displaced, while the spherical races 86 of bearing halves 82 and 84 remain in their original position with the spar 18. This is due to the shear action in the flat disc elastomeric portions of snubber 80. The effect of the shifting of the torque tube 24 and its pivot 31 relative to the inner portion of the snubber 80, and in particular ballrace 86, is to increase the pitch horn radius R an amount $\Delta R$, as depicted in FIG. 7b. This new pitch horn radius $R + \Delta R$ acts as the displaced location of pivot 31 to produce a rotational effect on the torque tube 24 (and hence outer blade 22), and decreases angle A by an angular amount $\Delta A$. Thus, in this prior art embodiment, the lag of the blade has been coupled to produce an undesired decrease in blade pitch. Conversely, it can be seen that a lead blade condition can produce an undesired increase in blade pitch. For lead or lag blade excursions that result in an increase or decrease of the pitch horn radius of approximately one inch, such coupling proves completely intolerable. Further, it appears that the coupling relationship is non-linear, and becomes more significant at large pitch angles. It will therefore be seen that in the illustrated prior art construction lead-lag blade excursions produce undesired pitch variation, whereas in Applicant's construction lead-lag excursions do not produce such undesired pitch change.

Thus, by comparison of the improved embodiment to the prior art, it is important that the blade freedoms of pitch, hunting (lead-lag), and flapping must be carefully considered and isolated at the point where pitch change is introduced in order to avoid coupling effects, especially those that might introduce a destabilizing pitch change. A specific teaching of this invention is the relationship of the decoupling means to each other, in this case the rotary and linear sliding surfaces.

I wish it to be understood that I do not desire to be limited to the exact details of construction shown and described, for obvious modifications will occur to a person skilled in the art.

I claim:

1. A helicopter cross beam rotor having a pair of opposed blades supported by a common flexible spar for rotation about an axis of rotation, each blade shaped at its inner end to envelope the spar in spaced relation, the inner end of the blade having a pitch horn to receive control inputs, said blade inner end centered about said spar by a bearing assembly including first and second bearing surfaces to produce relative sliding motion between the spar and blade inner end upon blade pitch angle changes, blade lead-lag, and blade flapwise bending, wherein said first bearing surface is spherical and said second bearing surface is flat.

2. A helicopter rotor according to claim 1 wherein said first bearing surface accommodates motion produced by blade pitch change and flapwise bending, and said second bearing surface accommodates motion produced by blade lead-lag.

3. A helicopter rotor according to claim 1 wherein said second bearing surface is located closer to the spar than said first bearing surface.

4. A helicopter rotor according to claim 1 wherein the blade inner end is a rigid, hollow torque tube and enveloping the spar in spaced relation and having an inner end connected to said pitch horn and an outer end connected to the remainder of the blade.

5. A helicopter rotor according to claim 1 wherein said bearing assembly comprises dual ball halves and mating sockets located on opposite sides of said spar wherein said sockets are each fixedly attached to the blade inner end, the ball and socket mating surfaces forming said first bearing surfaces, and wherein the inner portions of the ball halves form a flat surface to contact the opposite sides of the spar and forms the second bearing surfaces.

* * * * *